United States Patent
Adam et al.

(10) Patent No.: US 10,452,850 B2
(45) Date of Patent: Oct. 22, 2019

(54) PROTECTED SHELL FOR RISK VALIDATION

(71) Applicant: International Business Machines Corporation, Armonk, NY (US)

(72) Inventors: Constantin M. Adam, Norwalk, CT (US); Shang Q. Guo, Cortlandt manor, NY (US); John J. Rofrano, Mahopac, NY (US); Yaoping Ruan, White Plains, NY (US); Frederick Y. Wu, Greenwich, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 14/462,203

(22) Filed: Aug. 18, 2014

(65) Prior Publication Data
US 2016/0048685 A1 Feb. 18, 2016

(51) Int. Cl.
*G06F 21/00* (2013.01)
*G06F 21/57* (2013.01)
*G06F 21/56* (2013.01)

(52) U.S. Cl.
CPC .......... *G06F 21/577* (2013.01); *G06F 21/563* (2013.01); *G06F 2221/033* (2013.01)

(58) Field of Classification Search
USPC ..................................................... 726/22–25
See application file for complete search history.

(56) References Cited

U.S. PATENT DOCUMENTS

| 2010/0281173 A1* | 11/2010 | Vutukuri | G06F 21/305 709/228 |
| 2015/0052402 A1* | 2/2015 | Gurumurthy | G06F 11/3688 714/38.1 |
| 2015/0128250 A1* | 5/2015 | Lee | G06F 21/554 726/16 |
| 2015/0222604 A1* | 8/2015 | Ylonen | H04L 63/062 713/171 |

FOREIGN PATENT DOCUMENTS

| WO | WO0217541 | 2/2002 |
| WO | WO02061554 | 8/2002 |
| WO | WO2004107151 | 12/2004 |
| WO | WO2008005536 | 1/2008 |

OTHER PUBLICATIONS

Wikipedia, "sudo," downloaded from http://en.wikipedia.org/wiki/Sudo on Aug. 11, 2014.

* cited by examiner

*Primary Examiner* — Joseph P Hirl
*Assistant Examiner* — Chi D Nguy
(74) *Attorney, Agent, or Firm* — Kristofer Haggerty; Otterstedt, Wallace & Kammer, LLP

(57) ABSTRACT

On a computer system, a shell is invoked, through which a plurality of commands and/or scripts can be executed. Individual ones of the plurality of commands and/or scripts are validated. Given individual ones of the plurality of commands and/or scripts, for which the validation is successful, are executed via the shell.

21 Claims, 6 Drawing Sheets

PROTECTED SHELL FOR RISK VALIDATION

CROSS-REFERENCE TO RELATED APPLICATIONS

Not Applicable.

FIELD OF THE INVENTION

The present invention relates to the electrical, electronic and computer arts, and, more particularly, to information technology (IT) service management and the like.

BACKGROUND OF THE INVENTION

System administrators (SAs) generally have special access to computing systems; the actual SA account name might be, for example, "root," "administrator," "admin," "supervisor," or the like. Currently, "root access" or the like is an "all-or-nothing" proposition; i.e., assigning SAs different degrees of access is not possible.

The skilled artisan will appreciate that "sudo" is a program for Unix-like computer operating systems that allows users to run programs with the security privileges of another user (normally the superuser, or root). The name "sudo" is a concatenation of "su" (substitute user) and "do," or take action. A so-called "sudoers" configuration file enables configurability and gives different users various degrees of access to a machine.

SUMMARY OF THE INVENTION

Principles of the invention provide techniques for using a protected shell for risk validation. In one aspect, an exemplary method includes the step of invoking, on a computer system, a shell through which a plurality of at least one of commands and scripts can be executed; validating individual ones of the plurality of at least one of commands and scripts; and executing, via the shell, given individual ones of the plurality of at least one of commands and scripts, for which the validation is successful.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Capability to capture commands before they are being executed and validate them against a set of rules. By running on the local machine, the protected shell has immediate access to the operating environment, including system variables, aliases, current system state, and can use them in the validation process.

Capability to validate a command by taking into consideration its target. For example, an 'rm -rf' (remove) command can be acceptable to issue in a temporary folder, but not in the root folder of a managed computer.

A lower level implementation of the protected shell (at the kernel level) would have, aside from the capability to validate scripts, the additional capabilities of validating random binary applications that run on the machine (by ensuring they are not writing into certain locations).

Upon logging into a machine, an administrator must provide a ticket number that he or she is going to work on. The protected shell can dynamically load a new policy that is relevant to the new ticket and start validating the issued commands in that context.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
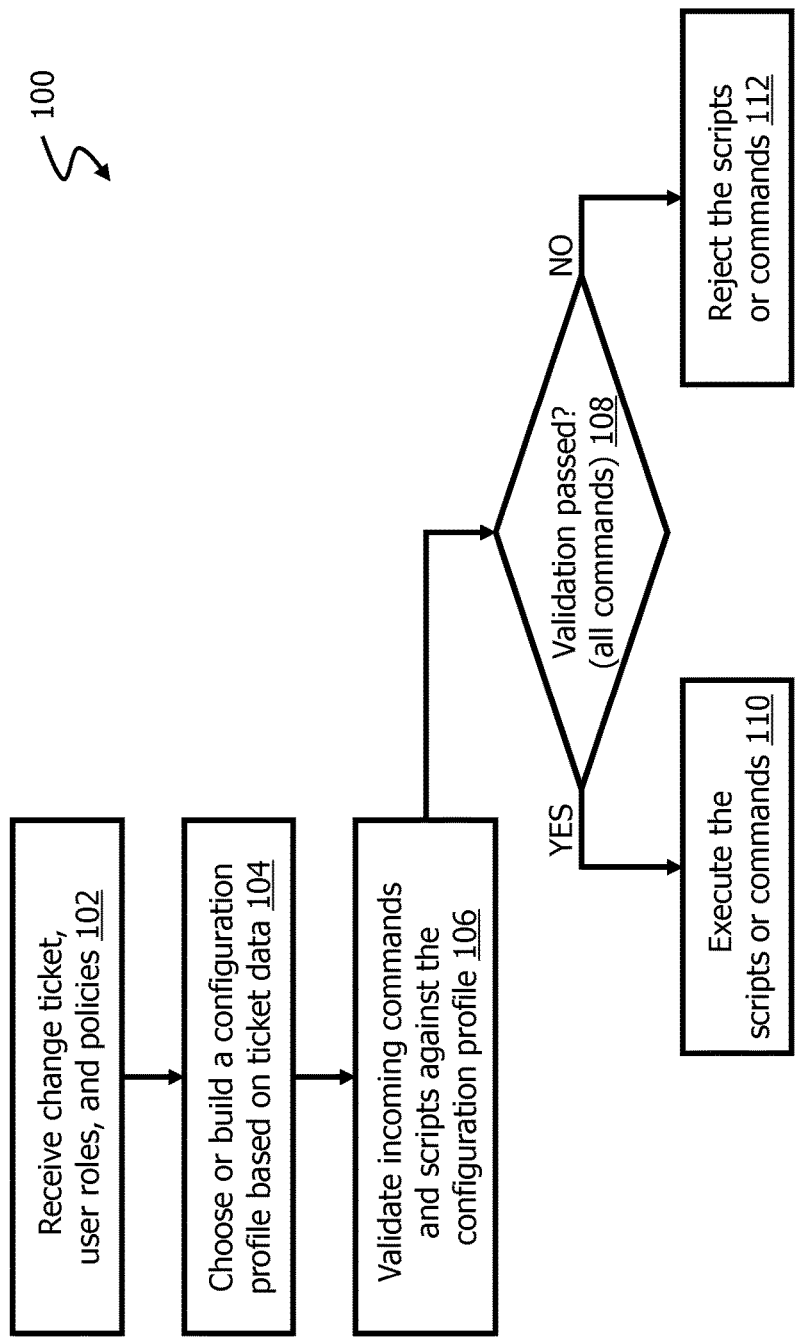
FIG. 1 presents a high-level flow chart, according to an aspect of the invention.

As described above, "root access," is currently an all-or-nothing proposition. One or more embodiments advantageously limit SAs to actions that are appropriate for their role(s) and/or for the tasks at hand. Consider that there are instances where a system administrator should not have access to all of the data in a system. For example, a server may contain customer data that a system administrator should not have access to; or a database manager should not have the authority to configure the web server, or reboot the machine.

Ordinarily, a system administrator should not be able to change the configuration of the active services on a machine. However, this functionality is needed when applying a patch.

One or more embodiments of the invention provide techniques for using a protected shell for risk validation to prevent human error. In particular, one or more embodiments provide a protected shell to limit system administrators to actions that are appropriate for their role or tasks at hand by proactively preventing disallowed operations or unwanted changes to a computer system (including the operating system (OS) and the application stack). As used herein, disallowed operations are operations that attempt to change or access resources in a configuration specified by the user.

One or more embodiments, in order to proactively prevent disallowed operations or unwanted changes to a computer system (including the OS and the application stack), create a shell through which all the commands or scripts are executed; this shell runs any scripts or commands in three steps:

1. Validate the commands invoked and their parameters (e.g., using a GO/NOT SURE/NO GO list approach: allow only commands in the GO list, forbid all commands in the NO GO list, and further investigate commands in the NOT SURE list to determine if they should be allowed or forbidden—see further discussion below).
2. Simulate the execution of the command, and estimate its effect on the system configuration (e.g., what changes will be made to the system configuration). Detect and block any commands that attempt to make changes to read-only parts of the configuration. More particularly, the validation can take place at two levels:
   a. Shell level—each command (and its set of parameters) is assigned to a category (GO, NOT SURE, NO GO). Commands in the GO category are accepted. Commands in the NOT SURE category are further checked for policy compliance. Commands in the NO GO category are rejected. The assignment of commands to categories, and the policy definitions for the NOT SURE commands are done on a per-scenario basis.
   b. Operating system level—each command ultimately translates into a series of system calls. Classify the system calls into intrusive and non-intrusive. Before executing an intrusive system call, check the object on which it will operate, and whether the policies in place allow modifying it. For example, before writing into a file descriptor, check the file associated with it. If the file is marked as read-only, deny the operation.
3. If the validation succeeds, execute the script or command.

In one or more embodiments, the shell is supported by a mechanism that builds the system configuration, as well as the read-only part of the configuration. By dynamically building the read-only configuration, one or more embodiments limit the SAs to actions that are appropriate for their role or tasks at hand.

In one or more embodiments, the validation is driven by the business rules, or the context in which the commands/scripts are received, rather than on the command syntax.

In one or more embodiments, there is a notion of time-bounded profiles in that access to certain resources and/or commands is only enabled at specific times, according to business rules.

In one or more embodiments, dynamically building the read-only configuration, the protected shell limits the system administrators to actions that are appropriate for their role or tasks at hand.

In one or more embodiments, the validation approach does not unnecessarily restrict access to commands that are deemed intrusive, thereby giving users the feeling of full authority.

In one or more embodiments, a command is allowed to run (execute) in one situation (e.g., if it does not change a pre-defined configuration) but is blocked in another situation (e.g., if the command attempts to change the pre-defined configuration).

In one or more embodiments, the system configuration can be changed as a function of the context (change ticket) under which the protected shell operates.

One or more embodiments provide a tool that prevents misuse of shell commands, and which is not enforced at the kernel.

One or more embodiments provide different access rights to all of the resources in the system, in a given context (that can be determined by the contents of the tickets for which work is done).

FIG. 1 is a flow chart depicting details of an exemplary method, according to an embodiment of the invention. In particular, an exemplary method 100 for validating a command and or a script is provided. In step 102 a change ticket is received, as are user roles and policies associated with the change ticket. Then in step 104, a configuration profile is built, or chosen from pre-made profiles, based on the change ticket data, including the user roles and policies. Incoming commands and/or scripts are then validated against the configuration profile in 106. As will be described further below with respect to FIG. 3 and FIG. 4, the validation can take place at two levels—a shell level and an operating system level. A determination is made in 108 whether all of the commands passed the validation testing. In some embodiments, a command that is initially rated as 'Not Sure' can pass the validation if its handler is handled in a certain way by the user. For example, if a 'shutdown' command has been issued, and, as a result, the user is presented with a confirmation screen asking 'Are you sure you want to execute this command?' and the user answers 'Yes' to this question, then the command will be validated. If successful (YES), the commands and/or scripts are executed in step 110. If not successful (NO), the commands and/or scripts are rejected in step 112.

Figure 2:
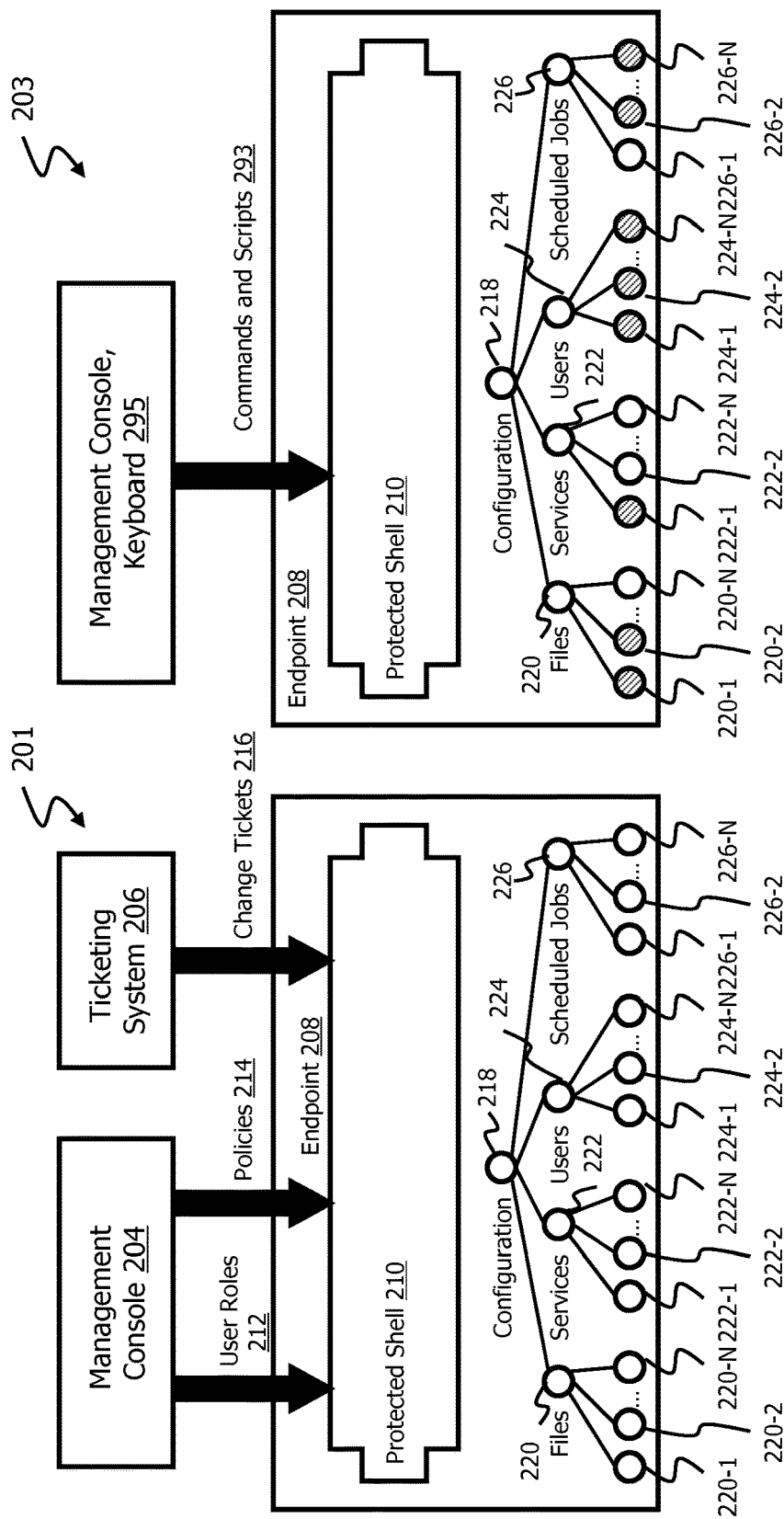
FIG. 2 presents an exemplary system diagram according to an aspect of the invention.

FIG. 2 shows a diagram of a system, in accordance with an embodiment of the invention, during two different states. The first state is shown at 201, while the second state is shown at 203. The protected shell 210 can run on a managed server, or on a management client (the latter in the case of the shell-based validation approach). Either aspect is generically referred to as an endpoint 208. In the first state, shown at 201, a ticket is received (e.g., a change ticket 216 from ticketing system 206), and, and based on this ticket, a set of user roles 212 and policies 214 is downloaded from the management console 204. In general, it should be noted that the policies can be downloaded locally, or from a centralized location. Once the policies are downloaded, the read-only part of the configuration 218 is built behind the protected shell 210.

Furthermore in this regard, as seen at 201, the read-only part of the configuration 218 is dynamically built based on change tickets 216, user roles 212, and/or policies 214. Management console 204 provides the protected shell 210 with the user roles 212 and policies 214. Ticketing system 206 provides the protected shell 210 with the change tickets 216. Thus, as seen at 201, build and/or select the appropriate configuration scenario, given a set of input change tickets, user roles, and policies. The configuration 218 is in tree form, including files 220 (with individual files 220-1, 220-2, . . . , 220-N); services 222 (with individual services 222-1, 222-2, . . . , 222-N); users 224 (with individual users 224-1, 224-2, . . . , 224-N); and scheduled jobs 226 (with individual scheduled jobs 226-1, 226-2, . . . , 226-N). Please note that "N" means an arbitrary integer and N is not necessarily the same for the files, services, users, and scheduled jobs.

In the non-limiting example, state 201 is assumed to start in a read-only configuration (i.e. all the nodes in the configuration tree 218 at 201 are read-only). Then, in state 203, after the application of the policies 214, some nodes have become writable (220-1, 220-2, 222-1, 224-1, 224-2, 224-N, 226-2, 226-N), as indicated by shading. That is to say, after reading the policies, some of the nodes will still be marked as read-only, while others will be writable. Alternatively, it is possible to start in a state where all the nodes are writable and, following the application of policies, some nodes become read-only.

As seen in state 203, subsequent incoming commands and/or scripts 293 obtained by protected shell 210 on endpoint 208 from management console and/or keyboard 295 are validated if they do not attempt to change configuration that has been marked as read-only. Thus, as seen on the right-hand side of FIG. 2, determine whether a script or command modifies the read-only configuration determined on the left-hand side; if no, proceed; if yes, deny the action.

In FIG. 1 step 102, note that the change ticket could come from a ticketing system, while user roles and policies could come from a (centralized) policy repository. Step 104, choosing or building a configuration profile based on ticket data (and the machine environment) could take place in the policy repository, as well. Steps 106 and following, validation of commands and scripts, and so on, could take place in the protected shell.

In one or more embodiments, the protected shell residing on the endpoint is invoked either through a system configuration tool (by setting the shell in which all the commands and/or scripts invoked by the tool will execute to the protected shell), or by logging on the machine (by setting the protected shell as the shell in the user's profile).

Figure 3:
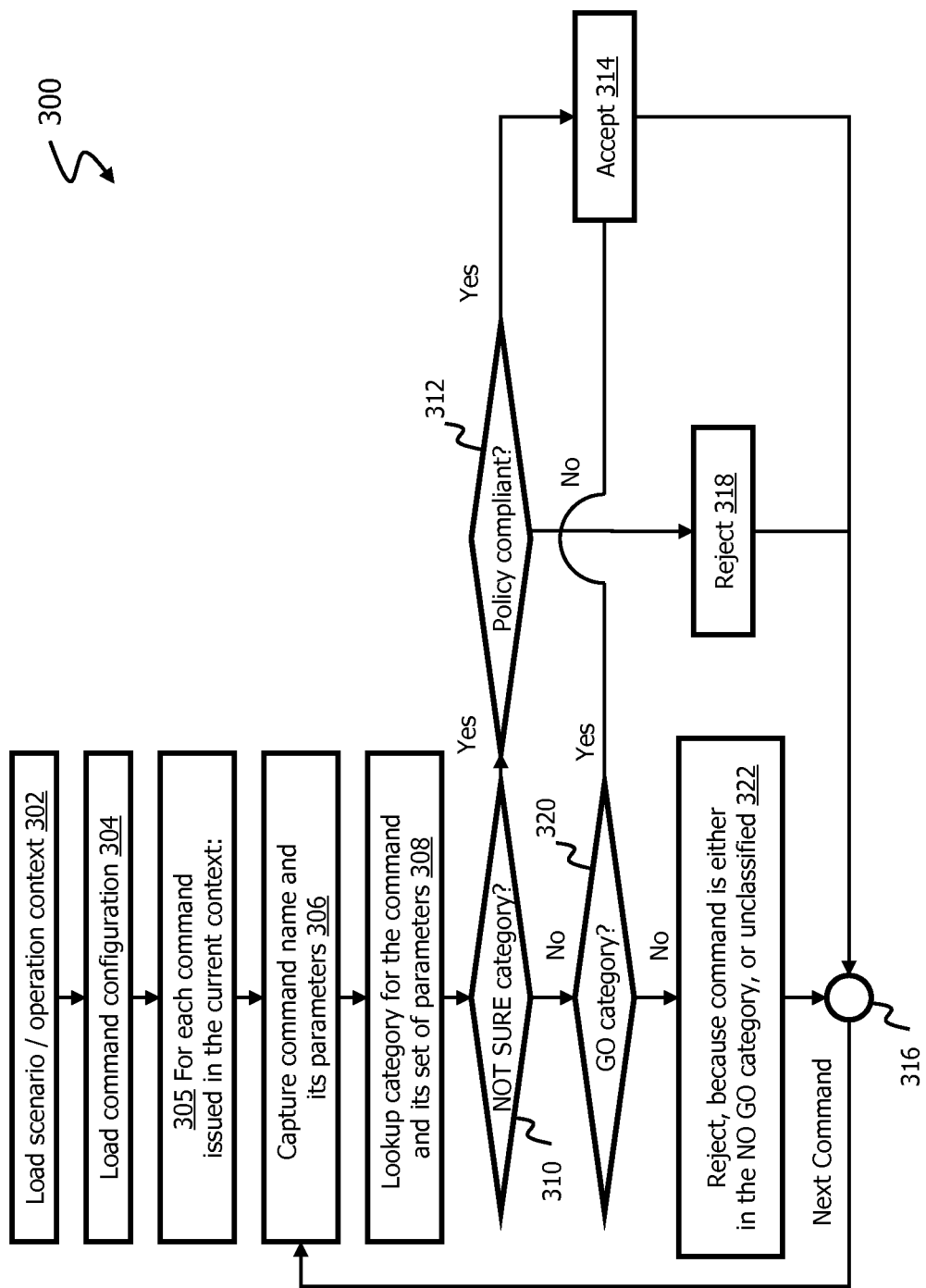
FIG. 3 presents a detailed flow chart, according to an aspect of the invention.

FIG. 3 is a flow chart 300 depicting details of an exemplary method for shell-based validation, in accordance with an embodiment of the invention. At 302, the scenario and/or operation context is loaded. For example, the ticket can refer to different types of changes: applying a patch that requires rebooting the computer, or connecting to a machine in order to manage a storage device, or performing work on a database. Each of these change types will require different commands to complete: a reboot might be allowed in the first case, but not in the second, or third case. In the second case, there will be two lists of monitored commands; first the only commands allowed on the managed server are those that allow to connect to the storage device. Once on the storage device, only a list of commands specific to that device can be performed. Finally, for the database management, the administrator might be assigned write access to the file system where the database is installed. All these commands and privileges will be stored in different profiles. Upon receiving a new ticket, the appropriate profiles are selected and downloaded on the server, and the protected shell the loads the command and resource configuration corresponding to each ticket.

Then, at 304, the command configuration is loaded. Elements 305, 316 bound a FOR-NEXT loop. The command name and its associated parameters are captured in step 306 for each command issued in the current context. For example, the same command can be categorized as a GO with some parameters, and NOT SURE with other parameters. Furthermore, the same command can be categorized as a NON GO if it has certain targets. For example, consider the remove ('rm') command. An interactive remove of a non-system file or folder (rm -i foo.txt bar) can be considered a GO command. Invoking the same command recursively, and without a prompt (rm -rf foo.txt bar) can be classified as NOT SURE, and require further confirmation from the user, as it can potentially delete a large number of files. Furthermore, applying this command to the root folder (rm -rf/bar) inadvertently or not, can be classified as NON GO and blocked.

In step 308, a category for the command and its set of parameters is looked-up in a look-up table (not shown). The lookup table can be contained in the profiles that are downloaded at the initiation of the session, once the administrator has specified a ticket that is to be worked on. In one or more embodiments, the category is one of a GO category, NOT SURE category, a NO GO category, or unclassified. Other suitable categories may be used.

In the example, each command, and its set of parameters, is assigned to a category (GO, NOT SURE, NO GO). In one or more embodiments, commands in the GO category are accepted, commands in the NOT SURE category are further checked for policy compliance, and commands in the NO GO category are rejected. The assignment of commands to categories, and the policy definitions for the NOT SURE commands, are carried out on a per-scenario basis.

Consider the following non-limiting Command Configuration Example:

1. Command "ls"—GO category, safe with any arguments;
2. Command "rm"—NOT SURE category, policy: safe only in folder /tmp (i.e. only safe when applied to a temporary folder)—refer to example above wherein the rm command can fall into all three categories, depending on the parameters, and targets passed to it;
3. Command "halt"—NO GO category—forbidden.

The command categories and policies for the NOT SURE commands can take different values in different contexts. One command can be in several categories, depending on the parameters with which it was issued. In some embodiments, for read parameters, the command is in the GO category, but for write parameters, the command is in the NOT SURE or NO GO category. For example, fdisk -l -u -c is in the GO category, but fdisk with any other parameters (which essentially manipulates the disk partition table) should go in the NOT SURE or NO GO category.

In the example of FIG. 3, at 310, a determination is made whether the category is a NOT SURE category. If yes, then a determination is made at 312 whether the command is policy compliant. If yes, the command is accepted at 314, and the method proceeds to 316 where the next command is available for validation, which returns the logical flow to step 306. If not compliant in decision block 312, the command is rejected at 318. If, in decision block 310, it is determined that the category is not "NOT SURE," it is next determined at decision block 320 whether the command is a GO category. If yes, the command is accepted at 314, and the method proceeds to step 316 where the next command is available for validation, which returns the logical flow to step 306. If not, the command is rejected at 322 because the command is either in the NO GO category or unclassified, and then the method proceeds to step 316 where the next command is available for validation, which returns the logical flow to step 306.

Figure 4:
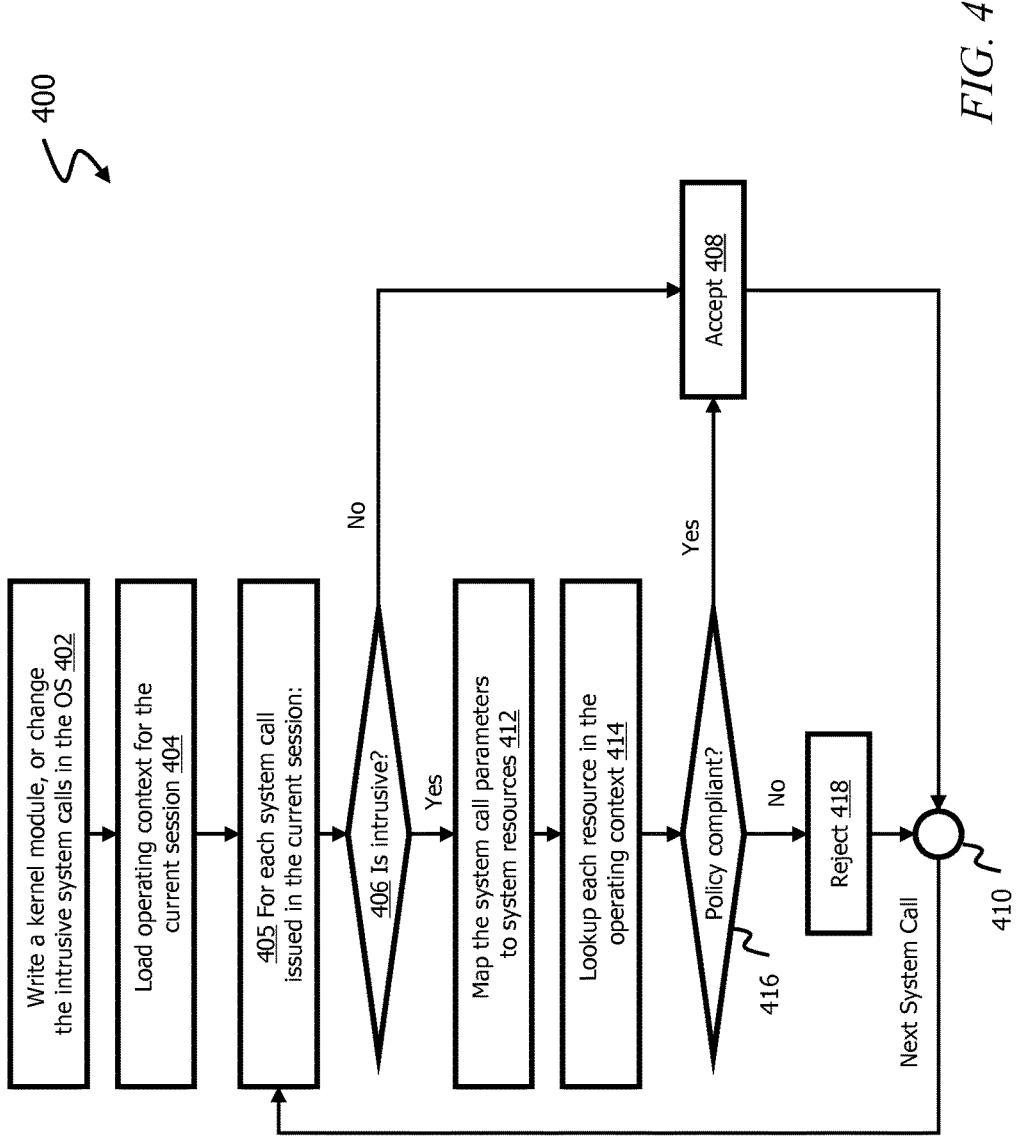
FIG. 4 presents a detailed flow chart, according to an aspect of the invention.

FIG. 4 is a flow chart 400 depicting details of an exemplary method for operating system-based validation, in accordance with an embodiment of the invention.

In one or more embodiments, in an OS level-based validation, each command ultimately translates into a series of system calls. This approach is useful when the goal is to validate not a script or command that has been issued to the system, but a binary file. If it is desired to run a binary file to perform an operation on the system, the contents of the file cannot be seen, nor can it be seen which commands it will perform. However, it is still possible to capture all the system calls that this binary file makes. The WRITE system call is intrusive, while the READ is not. If it is detected that the binary file is attempting to write into a location that has been marked as read-only, this can be prevented, and hence, damage to the system can be avoided. In this way, it is possible to validate binary files that cannot be interpreted at the shell level. The system calls can then be classified as intrusive and non-intrusive. Generally, before executing an intrusive system call, the object on which it will operate is checked and it is determined whether the policies in place allow modifying the object. For example, before writing into a file descriptor, check the file associated with the file descriptor. If the file is marked as read-only, the operation to write into the file descriptor is denied.

In step 402 a kernel module is written or the intrusive system calls are changed in the OS. For example, a write system call will check the location in which it is writing. If the location is read-only, the operation will abort. Then, load the operating context for the current session, in step 404. Elements 405, 410 bound a FOR-NEXT loop. In decision block 406, for each system call issued in the current session, determine whether each system call is intrusive. If not intrusive (NO), the system call (and therefore the command) is accepted in 408, and the method proceeds to 410 where the next system call is available for validation, which returns the logical flow to the beginning of the FOR-NEXT loop at 405. If decision block 406 returns a YES (intrusive), then map the system call parameters to the system resources (e.g., files) in 412.

As an example of mapping a system call parameter to a system resource, consider the ssize_t sys_write (unsigned int fd, const char * buf, size_t count). In this example, the OS kernel code detects the file descriptor (fd) parameter, maps the file descriptor to a file, and then checks the existence of any policies for that file and compliance with those policies.

In step 414, look up each resource in the operating context. A determination is made in decision block 416 whether the system call is policy compliant. If compliant (YES), then the system call is accepted in step 408, and the method proceeds to 410 where the next system call is available for validation, which returns the logical flow to the beginning of the FOR-NEXT loop at 405. If decision block 416 returns not compliant (NO), the system call is rejected at step 418, and the method proceeds to 410 where the next system call is available for validation, which returns the logical flow to the beginning of the FOR-NEXT loop at 405.

In FIG. 3, steps 302 and 304, note that the scenario, operation context and command configuration can be loaded from a policy repository. Regarding the steps within the FOR-NEXT loop bounded by 305, 316, capturing the command name, parameters and target, as well as the validation, can take place in the protected shell.

In FIG. 4, step 404, note that the operation context can be loaded from a policy repository. Regarding the steps within the FOR-NEXT loop bounded by 405, 410, these can take place in the protected shell.

Given the discussion thus far, it will be appreciated that, in general terms, an exemplary method, according to an aspect of the invention, includes the step of invoking, on a computer system 208, 512, a shell 210 through which a plurality of commands and/or scripts can be executed. A further step 106 includes validating individual ones of the plurality of commands and/or scripts. A still further step 110 includes executing, via the shell, given individual ones of the plurality of commands and/or scripts, for which the validation is successful.

In some instances, the validating is carried out based on user roles 212, policies 214, and a configuration profile. In some such instances, further steps include obtaining change tickets 216; and accessing the configuration profile based on the change tickets.

This latter accessing step can include choosing an existing configuration profile based on the change tickets or building a new configuration profile based on the change tickets.

In some cases, the validating is carried out at shell level by the shell (see FIG. 3). In some such cases, the validating comprises (see 308) assigning each individual one of the plurality of at least one of commands and scripts to a category, the categories comprising at least a GO category and a NO GO category; accepting individual ones of the plurality of at least one of commands and scripts in the GO category, as at 314; and rejecting individual ones of the plurality of at least one of commands and scripts in the NO GO category, as at 322.

In some such cases, in the assigning step, the categories further comprise a NOT SURE category (see step 310), and further steps include accepting individual ones of the plurality of at least one of commands and scripts in the NOT SURE category if policy-compliant, as at 314 reached by YES branch of decision block 312; and rejecting individual ones of the plurality of at least one of commands and scripts in the NO GO category if not policy-compliant, as at 318 reached by NO branch of decision block 312.

In some cases, the validating is carried out at operating system level (see FIG. 4). In some such cases, the validating comprises, for a plurality of system calls associated with the plurality of at least one of commands and scripts: accepting non-intrusive ones of the system calls (as at 408 reached by NO branch of decision block 406); accepting intrusive ones of the system calls, if policy-compliant (as at 408 reached by YES branch of decision block 416); and rejecting intrusive ones of the system calls, if not policy-compliant (as at 418 reached by NO branch of decision block 416).

Figure 6:
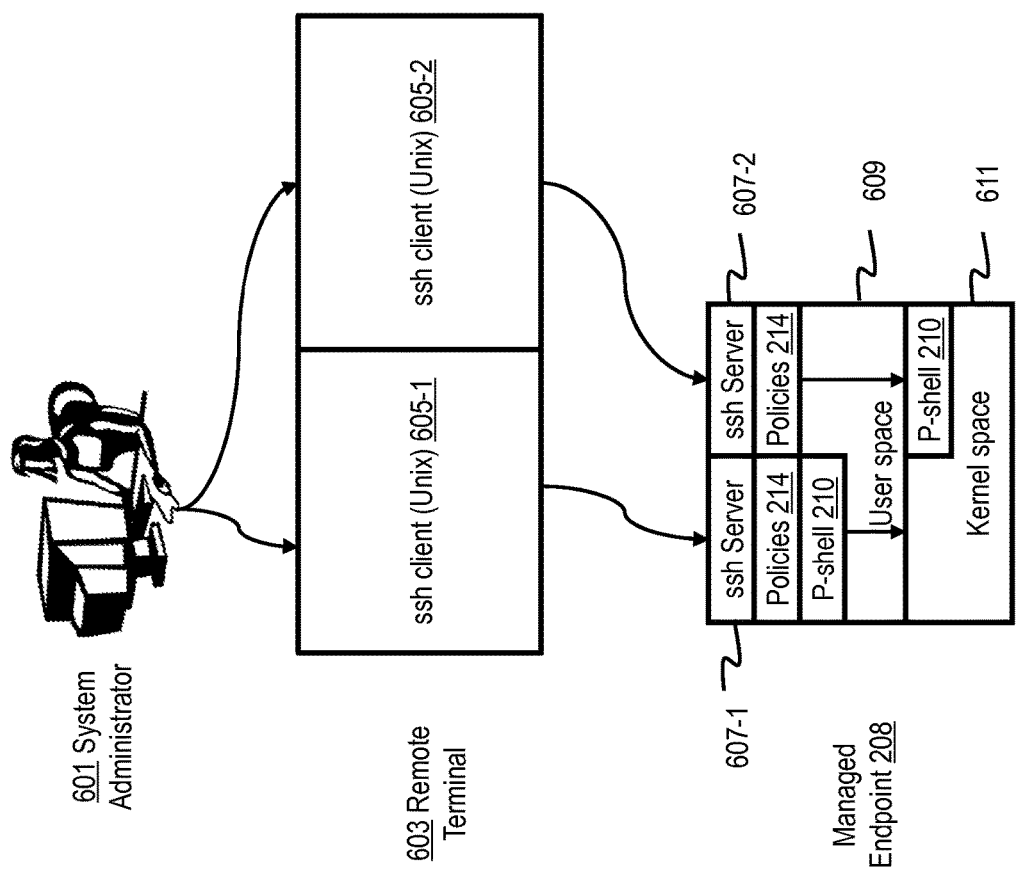
FIG. 6 shows the implementation of a protected shell in the user space versus the implementation of a protected shell at the kernel level.

Furthermore in this regard, FIG. 6 shows the implementation of a protected shell in the user space versus the implementation of a protected shell at the kernel level. System administrator 601 employs remote terminal 603. In the former case, Unix ssh client 605-1 on terminal 603 interacts with ssh server 607-1 in user space 609 on endpoint 208. Policies 214 and protected shell 210 also reside within user space 609. On the other hand, in the latter case, Unix ssh client 605-2 on terminal 603 interacts with ssh server 607-2 in user space 609 on endpoint 208. Policies 214 also reside within user space 609. However, protected shell 210 resides within kernel space 611. The former approach protects against unintentional commands and restricts all remote logins. It requires installation on endpoint 208 and may not protect against arbitrary executables. On the other hand, the latter approach protects against unintentional commands, restricts all remote logins, and protects against all executables and commands. It requires installation on endpoint 208 (kernel modification).

In another aspect, an exemplary computer system 208, 512 includes a memory 504 and at least one processor 502 coupled to the memory. The at least one processor 502 is operative to carry out or otherwise facilitate any one, some, or all of the method steps described herein. For example, instructions are stored on a computer readable storage medium which configure the processor 502.

In still another aspect, a computer program product includes a computer readable storage medium having program instructions embodied therewith. The computer readable storage medium is not a transitory signal per se, and the program instructions are executable by a computer system 208, 512 to cause the computer system to perform any one, some, or all of the method steps described herein.

One or more embodiments of the invention, or elements thereof, can be implemented in the form of an apparatus including a memory and at least one processor that is coupled to the memory and operative to perform exemplary method steps.

Figure 5:
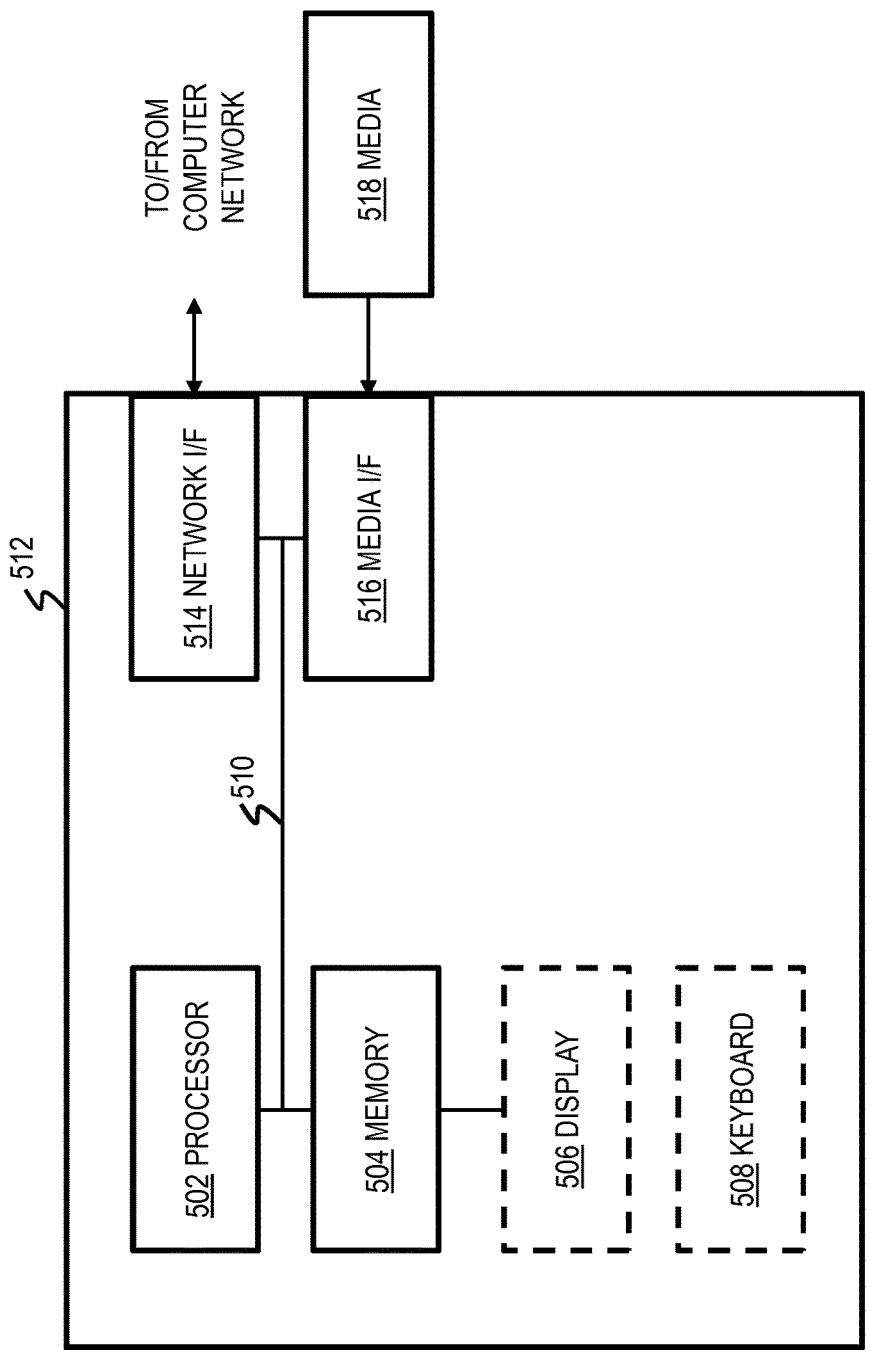
FIG. 5 depicts a computer system that may be useful in implementing one or more aspects and/or elements of the invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIG. 2 (protected shell 210, management console 204 accessing a policy repository, ticketing system 206, and the like). The method steps can then be carried out using the distinct software modules and/or sub-modules of the system, as described above, executing on one or more hardware processors such as 502. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    invoking, on a computer system, a shell through which a plurality of at least one of commands and scripts can be executed;
    validating individual ones of said plurality of at least one of commands and scripts at least in part by simulating execution of said individual ones of said plurality of at least one of commands and scripts to estimate effects of said execution on a configuration of said computer system; and executing, via said shell, given individual ones of said plurality of at least one of commands and scripts, for which said validation is successful.

2. The method of claim 1, wherein said validating is carried out based on user roles, policies, and a configuration profile.

3. The method of claim 2, further comprising:
obtaining change tickets; and
accessing said configuration profile based on said change tickets.

4. The method of claim 3, wherein said accessing comprises choosing an existing configuration profile based on said change tickets.

5. The method of claim 3, wherein said accessing comprises building a new configuration profile based on said change tickets.

6. The method of claim 3, wherein said validating is carried out at shell level by said shell.

7. The method of claim 6, wherein said validating comprises:
assigning each individual one of said plurality of at least one of commands and scripts to a category, said categories comprising at least a GO category and a NO GO category;
accepting individual ones of said plurality of at least one of commands and scripts in said GO category; and
rejecting individual ones of said plurality of at least one of commands and scripts in said NO GO category.

8. The method of claim 7, wherein, in said assigning step, said categories further comprise a NOT SURE category, further comprising:
accepting individual ones of said plurality of at least one of commands and scripts in said NOT SURE category if policy-compliant; and
rejecting individual ones of said plurality of at least one of commands and scripts in said NO GO category if not policy-compliant.

9. The method of claim 3, wherein said validating is carried out at operating system level.

10. The method of claim 9, wherein said validating comprises, for a plurality of system calls associated with said plurality of at least one of commands and scripts:
accepting non-intrusive ones of said system calls;
accepting intrusive ones of said system calls, if policy-compliant; and
rejecting intrusive ones of said system calls, if not policy-compliant.

11. The method of claim 1, wherein said executing comprises changing said configuration of said computer system.

12. A computer system comprising:
a memory; and
at least one processor, coupled to said memory, and operative to:
invoke a shell through which a plurality of at least one of commands and scripts can be executed;
validate individual ones of said plurality of at least one of commands and scripts at least in part by simulating execution of said individual ones of said plurality of at least one of commands and scripts to estimate effects of said execution on a configuration of said computer system; and
execute, via said shell, given individual ones of said plurality of at least one of commands and scripts, for which said validation is successful.

13. The computer system of claim 12, wherein said at least one processor is operative to validate based on user roles, policies, and a configuration profile.

14. The computer system of claim 13, wherein said at least one processor is further operative to:
obtain change tickets; and
access said configuration profile based on said change tickets.

15. The computer system of claim 14, wherein said at least one processor is operative to access by choosing an existing configuration profile based on said change tickets.

16. The computer system of claim 14, wherein said at least one processor is operative to access by building a new configuration profile based on said change tickets.

17. A computer program product, the computer program product comprising a computer readable storage medium having program instructions embodied therewith, wherein the computer readable storage medium is not a transitory signal per se, the program instructions executable by a computer system to cause the computer system to perform a method comprising:
invoking, on the computer system, a shell through which a plurality of at least one of commands and scripts can be executed;
validating individual ones of said plurality of at least one of commands and scripts at least in part by simulating execution of said individual ones of said plurality of at least one of commands and scripts to estimate effects of said execution on a configuration of said computer system; and
executing, via said shell, given individual ones of said plurality of at least one of commands and scripts, for which said validation is successful.

18. The computer program product of claim 17, wherein said validating is carried out based on user roles, policies, and a configuration profile.

19. The computer program product of claim 18, wherein the program instructions are executable by the computer system to cause the computer system to perform said method, said method further comprising:
obtaining change tickets; and
accessing said configuration profile based on said change tickets.

20. The computer program product of claim 19, wherein said accessing comprises choosing an existing configuration profile based on said change tickets.

21. The computer program product of claim 19, wherein said accessing comprises building a new configuration profile based on said change tickets.

* * * * *